(12) United States Patent
Kato

(10) Patent No.: US 7,916,375 B2
(45) Date of Patent: Mar. 29, 2011

(54) OPTICAL SCANNING APPARATUS AND METHOD FOR ADJUSTING THE SAME

(75) Inventor: Manabu Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 12/197,156

(22) Filed: Aug. 22, 2008

(65) Prior Publication Data

US 2009/0051998 A1   Feb. 26, 2009

(30) Foreign Application Priority Data

Aug. 24, 2007   (JP) ................. 2007-218305

(51) Int. Cl.
 *G02B 26/08* (2006.01)
(52) U.S. Cl. .................................. 359/215.1
(58) Field of Classification Search .... 359/212.1–214.1; 250/234–236
 See application file for complete search history.

(56) References Cited

U.S. PATENT DOCUMENTS 7,005,631 B2 *   2/2006   Kurosawa ............ 250/234

FOREIGN PATENT DOCUMENTS

| JP | 2-087112 A | 3/1990 |
|---|---|---|
| JP | 7-023908 A | 1/1995 |
| JP | 2002-182147 A | 6/2002 |
| JP | 2007-140399 A | 6/2007 |

* cited by examiner

*Primary Examiner* — Euncha P Cherry
(74) *Attorney, Agent, or Firm* — Canon U.S.A., Inc. I.P. Division

(57) ABSTRACT

An optical scanning apparatus includes a light source having a light-emitting point; a light-beam converting unit configured to convert a state of a light beam emitted from the light-emitting point of the light source into another state; a deflecting unit configured to deflect and scan the light beam emitted from the light-beam converting unit, the deflecting unit including a resonant deflecting element having a single deflecting surface that reciprocates around an axis; and an imaging optical unit configured to cause the light beam deflected and scanned by the deflecting surface of the deflecting unit to form an image on a surface to be scanned. The distance between the light-emitting point of the light source and the light-beam converting unit is adjusted based on information obtained by a detector that detects the light beam emitted from the light source and deflected by the deflecting surface of the deflecting unit.

9 Claims, 10 Drawing Sheets

OPTICAL SCANNING APPARATUS AND METHOD FOR ADJUSTING THE SAME

BACKGROUND OF THE INVENTION

1. Field of the Invention

The present invention relates to an optical scanning apparatus and a method for adjusting the optical scanning apparatus. The optical scanning apparatus is suitable for use in an image-forming apparatus, such as a laser beam printer (LBP), a digital copy machine, and a multifunction printer, which performs electrophotography processes.

2. Description of the Related Art

In general, an optical scanning apparatus, such as a laser beam printer (LBP), optically modulates a light beam emitted from a light source in accordance with an image signal.

The optically modulated light beam is periodically deflected by a light deflector including, for example, a polygonal mirror, and is focused by an imaging optical unit having fθ characteristics on a surface of a photosensitive recording medium so that a spot image is formed on the surface.

FIG. 13 is a schematic diagram illustrating the main part of a known optical scanning apparatus.

Referring to FIG. 13, a light beam emitted from a light source 1001 is collimated by a collimator lens 1002, and an aperture stop 1003 limits the light beam that passes through. The light beam that passes through the aperture stop 1003 is incident on a cylindrical lens 1004.

The collimated light beam that is incident on the cylindrical lens 1004 is output without change in the main-scanning cross section. In the sub-scanning cross section, the light beam converges so that a substantially linear image is formed on a deflecting surface (reflective surface) 1095a of a light deflector 1095 including a polygonal mirror.

The light beam deflected by a deflecting surface of the deflecting unit 1095 is guided to a surface to be scanned 1008 through an imaging optical unit (imaging optical system) 1006 having fθ characteristics.

The deflecting unit 1095 is rotated in the direction shown by the arrow A, thereby causing the light beam to scan the surface to be scanned 1008 in the direction shown by the arrow B.

Recently, the size of image forming apparatuses has been reduced and the definition thereof has been increased. Accordingly, there has been a demand for optical scanning apparatuses having small, high-definition optical systems. In particular, there is a strong demand for a small polygonal mirror, which functions as a deflecting unit, and a drive motor for rotating the polygonal mirror.

To satisfy such a demand, various kinds of optical scanning apparatuses have been suggested which include, as a deflecting unit, a resonant deflecting element having a deflecting surface that reciprocates around an axis (see Japanese Patent Laid-Open No. 2002-182147).

FIG. 14 is a schematic diagram illustrating the main part of a typical resonant deflecting element.

Referring to FIG. 14, a resonant deflecting element 1056 includes a frame body 1058 and a deflector 1057 positioned inside the frame body 1058. The deflector 1057 is held by two torsion bars 1059 extending in a sub-scanning direction that is perpendicular to a main scanning surface (deflection scanning surface).

Attractive and repulsive forces generated by electrostatic force, magnetic force, Lorentz force, etc., are applied between a deflecting surface 1057a and the frame body 1058 so that the deflecting surface 1057a can reciprocate.

A light beam from a light source (not shown) is incident on the deflecting surface 1057a of the deflector 1057, and is deflected in response to the reciprocating motion of the deflecting surface 1057a.

The speed of the reciprocating motion can be increased by using the resonant deflecting element under a resonant condition of sine vibration. Recently, the speed has been increased to a level that cannot be achieved by a rotary deflecting element using a polygonal mirror.

In addition, the size of the resonant deflecting element has been reduced due to micromachining technology involving semiconductor processes. The power consumption performance, noise reduction performance, etc., of the resonant deflecting element are also superior to those of the rotary deflecting element.

There are several problems in using the resonant deflecting element. One of the problems is the size of the deflecting surface of the resonant deflecting element.

As mentioned in Japanese Patent Laid-Open No. 2002-182147, the resonant deflecting element has a problem that it is difficult to increase the size of the deflecting surface. Even though it is possible to increase the size of the deflecting surface, there is a trade off between the increase in the size of the deflecting surface and the performance, such as speed, deflecting angle, jitter suppression, etc., of the optical deflecting unit.

The size of the deflecting surface is a factor that determines the laser-beam spot diameter on the surface to be scanned. If the size of the deflecting surface is small, the spot size on the surface to be scanned is large. In such a case, high-precision printing cannot be performed.

According to Japanese Patent Laid-Open No. 2002-182147, the above-described problem is solved by forming a so-called over-field scanner (OFS) optical system that causes a wide light beam to be incident on the deflecting surface.

The second problem is surface accuracy (warping) of the deflecting surface. The deflecting surface of the resonant deflecting element is not formed of a metal block as in a polygonal mirror, but is formed of a thin body with a thickness of several hundreds of micrometers that is made of a semiconductor material such as silicon (Si). Thus, the deflecting surface can be effectively driven with low power consumption.

Since the thickness of the body that defines the deflecting surface is small, the surface accuracy of the deflecting surface is lower than that of the deflecting surface of the polygonal mirror.

In addition, a reflectance-increasing film and a protecting film are deposited on the silicon body. Therefore, tension is applied by these films, which causes the deflecting surface to warp in the form of a second order function.

When the deflecting surface is warped, the light beam cannot be focused on the surface to be scanned and the image quality will be degraded.

SUMMARY OF THE INVENTION

The present invention is directed to an optical scanning apparatus which is capable of suppressing variation in the focus state of a surface to be scanned due to warping of a deflecting surface of a resonant deflecting element, and in which the size of the deflecting surface is minimized. The present invention is also directed to a method for controlling the optical scanning apparatus.

According to an aspect of the present invention an optical scanning apparatus includes a light source having a light-emitting point; a light-beam converting unit configured to convert a state of a light beam emitted from the light-emitting point of the light source into another state; a deflecting unit configured to deflect and scan the light beam emitted from the light-beam converting unit, the deflecting unit including a resonant deflecting element having a single deflecting surface that reciprocates around an axis; and an imaging optical unit configured to cause the light beam deflected and scanned by the deflecting surface of the deflecting unit to form an image on a surface to be scanned. A method for adjusting the optical scanning apparatus includes detecting the light beam emitted from the light source, deflected by the deflecting surface of the deflecting unit, and transmitted through the imaging optical unit with a first detector; and adjusting a distance between the light-emitting point of the light source and the light-beam converting unit with an adjusting unit based on information obtained by the first detector.

In the method for adjusting the optical scanning apparatus, the light beam may be detected by the first detector is incident on the first detector at an outermost position along an axis in a main scanning direction.

In the method for adjusting the optical scanning apparatus, information regarding a spot diameter of the light beam on the surface to be scanned may be obtained from the light beam detected by the first detector.

In the method for adjusting the optical scanning apparatus, information regarding peak power of the light beam on the surface to scanned may be obtained from the light beam detected by the first detector.

In the method for adjusting the optical scanning apparatus, the following condition may be satisfied:

$$0.001 < 2k/(Rm+2k) < 0.02$$

where k is a scanning angular speed of a spot on the surface to be scanned and Rm is a radius of curvature obtained when a warped shape of the deflecting surface of the resonant deflecting element in a main-scanning direction is fitted to an arc shape by the least squares method.

The method for adjusting the optical scanning apparatus may further include detecting a light beam that does not reach the deflecting surface of the deflecting unit with a second detector different from the first detector; and adjusting a positional relationship between the light-emitting point of the light source and the light-beam converting unit in a direction perpendicular to an optical axis with the adjusting unit based on information obtained by the second detector.

According to at least one embodiment of the present invention an optical scanning apparatus includes a light source having a light-emitting point; a light-beam converting unit configured to convert a state of a light beam emitted from the light-emitting point of the light source into another state; a deflecting unit configured to deflect and scan the light beam emitted from the light-beam converting unit, the deflecting unit including a resonant deflecting element having a single deflecting surface that reciprocates around an axis; and an imaging optical unit configured to cause the light beam deflected and scanned by the deflecting surface of the deflecting unit to form an image on a surface to be scanned. A method for adjusting the optical scanning apparatus includes detecting the light beam that is emitted from the light source and that does not reach the deflecting surface of the deflecting unit with a first detector; and adjusting a positional relationship between the light-emitting point of the light source and the light-beam converting unit in a direction perpendicular to an optical axis with an adjusting unit based on information obtained by the first detector.

In the method for adjusting the optical scanning apparatus, the adjusting unit may adjust the positional relationship between the light-emitting point of the light source and the light-beam converting unit in the direction perpendicular to the optical axis such that roughly all of the light beam emitted from the light source and transmitted through the light-beam converting unit is incident on the deflecting surface of the deflecting unit.

In the method for adjusting the optical scanning apparatus, the first detector may be disposed at a position that is optically equivalent to a position of the deflecting surface of the deflecting unit.

In the method for adjusting the optical scanning apparatus, the following condition may be satisfied:

$$1.0 \times Lm/\cos \theta max + d \tan \theta max < Dm < 1.2 \times Lm/\cos \theta max + d \tan \theta max$$

where Dm is the width of the deflecting surface of the resonant deflecting element in a main-scanning direction, d is the thickness of a body forming the deflecting surface, Lm is the beam diameter of the light beam incident on the deflecting surface in the main-scanning direction, and θmax is the angle of the deflecting surface at the time when the light beam is deflected toward an outermost position with respect to an angle of the deflecting surface at the time when the light beam is deflected toward a scanning center.

The method for adjusting the optical scanning apparatus may further include detecting the light beam that is deflected by the deflecting surface of the deflecting unit with a second detector different from the first detector; and adjusting a distance between the light-emitting point of the light source and the light-beam converting unit along the optical axis with the adjusting unit based on information obtained by the second detector.

The present invention provides an optical scanning apparatus which is capable of suppressing variation in the focus state of a surface to be scanned due to warping of a deflecting surface of a resonant deflecting element, and in which the size of the deflecting surface is minimized. The present invention also provides a method for controlling the optical scanning apparatus.

Further features of the present invention will become apparent from the following description of exemplary embodiments with reference to the attached drawings.

DESCRIPTION OF THE EMBODIMENTS

Embodiments of the present invention will be described with reference to the accompanying drawings.

First Embodiment

Figure 1:
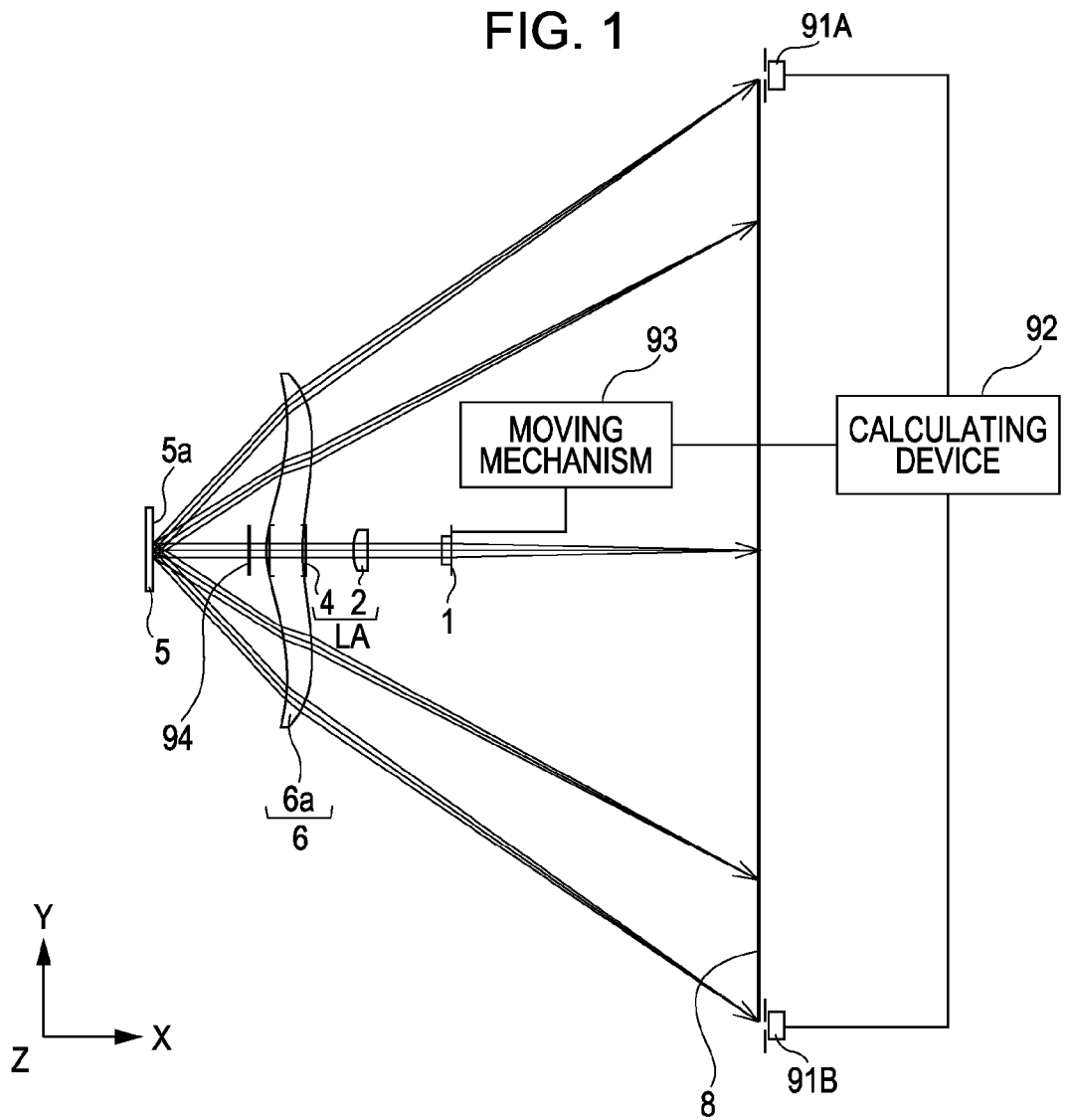
FIG. 1 is a main-scanning cross section of a structure according to a first embodiment of the present invention.
Figure 2:
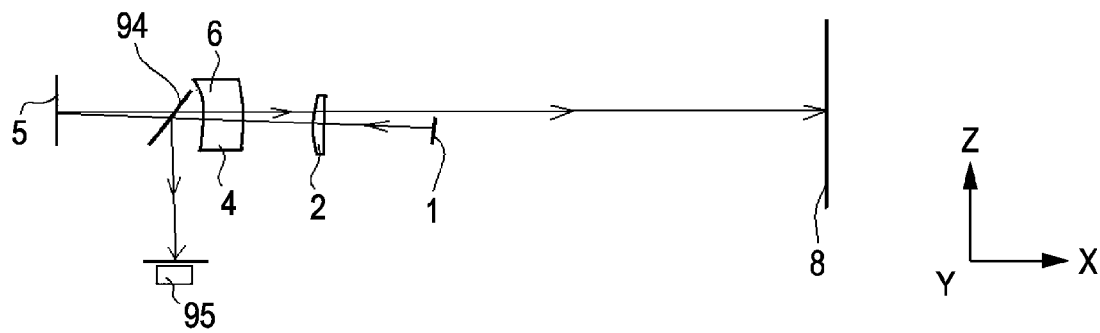
FIG. 2 is a sub-scanning cross section of the structure according to the first embodiment.

FIG. 1 illustrates a cross section of a structure according to a first embodiment of the present invention taken along a main-scanning direction (main-scanning cross section), and FIG. 2 illustrates a cross section of the structure taken along a sub-scanning direction (sub-scanning cross section).

In the following description, the main-scanning direction (Y direction) is a direction perpendicular to both a rocking axis of a deflecting unit and an optical axis (X direction) of an imaging optical unit, that is, a direction in which a light beam is deflected and scanned by the deflecting unit. The sub-scanning direction (Z direction) is a direction parallel to the rocking axis of the deflecting unit. The main-scanning cross section is taken along a plane that includes the optical axis of the imaging optical unit and that is parallel to the main-scanning direction. The sub-scanning cross section is taken along a plane that includes the optical axis of the imaging optical unit and that is perpendicular to the main-scanning cross section.

Referring to FIGS. 1 and 2, a light source 1 is composed of, for example, a semiconductor laser. A collimator lens 2 functions as a light-beam converting unit and converts the state of a light beam emitted from a light-emitting point (light-emitting unit) of the light source 1 into another state.

In the present embodiment, a divergent light beam is emitted from the light-emitting point of the light source 1 and is converted into a convergent light beam by the collimator lens 2. A cylindrical lens 4 has a power (refractive power) only in a sub-scanning cross section (sub-scanning direction).

The cylindrical lens 4 receives the light beam that is converted into the convergent light beam by the collimator lens 2 and causes the light beam to form a linear image on a deflecting surface 5a of a resonant deflecting element 5, which will be described below, in the sub-scanning cross section.

The cylindrical lens 4 is formed integrally with an imaging lens 6a, which will be described below.

The collimator lens 2 and the cylindrical lens 4 serve as elements of an incident optical system LA.

The resonant deflecting element 5 is a deflecting element that functions as a deflecting unit. The resonant deflecting element 5 is provided with the deflecting surface 5a that reciprocates around an axis.

An imaging optical unit (imaging optical system) 6 includes the imaging lens (toric lens) 6a made of a plastic material having different powers in the main-scanning direction and the sub-scanning direction.

In the main-scanning cross section, the imaging optical unit 6 causes the light beam which represents image information and which is deflected and scanned by the resonant deflecting element 5 to form an image on a photosensitive drum surface 8. In the sub-scanning cross section, the imaging optical unit 6 performs surface-tilt correction of the deflecting surface 5a of the resonant deflecting element 5 in the sub-scanning cross section.

The photosensitive drum surface 8 functions as a surface to be scanned.

According to the present embodiment, the divergent light beam is optically modulated in accordance with the image information, emitted from the light source 1, converted into the convergent light beam by the collimator lens 2, and is incident on the cylindrical lens 4.

In the main-scanning cross section, the convergent light beam passes through the cylindrical lens 4 and is incident on the deflecting surface 5a of the resonant deflecting element 5 at the center of the vibration angle (deflecting angle) (front incidence).

In the sub-scanning cross section, the light beam is incident on the deflecting surface 5a at an angle with respect to the sub-scanning direction (oblique incidence), and is caused to form a linear image on the deflecting surface 5a (oblique incidence optical system).

The light beam is deflected and scanned in the main-scanning direction in response to the reciprocating motion of the deflecting surface 5a of the resonant deflecting element 5. Then, the light beam passes through the imaging lens 6a which guides it toward the surface to be scanned 8.

Thus, due to the reciprocating motion of the deflecting surface 5a of the resonant deflecting element 5, the photosensitive drum surface 8 is optically scanned in the main-scanning direction.

In this manner, an image is recorded on the photosensitive drum surface 8, which functions as a recording medium.

Figure 3:
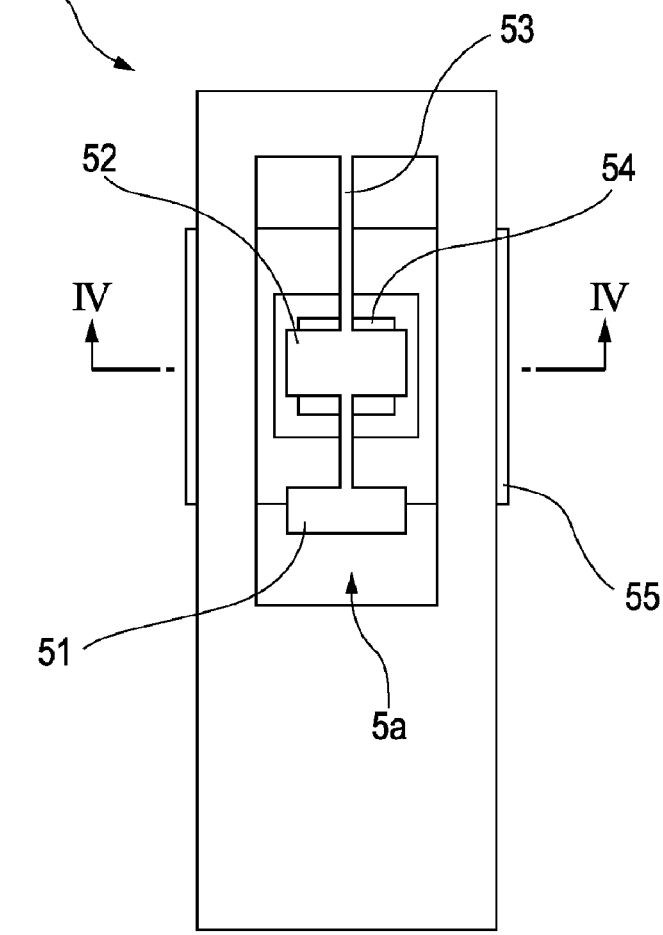
FIG. 3 is a front view of a resonant deflecting element according to the first embodiment.
Figure 4:
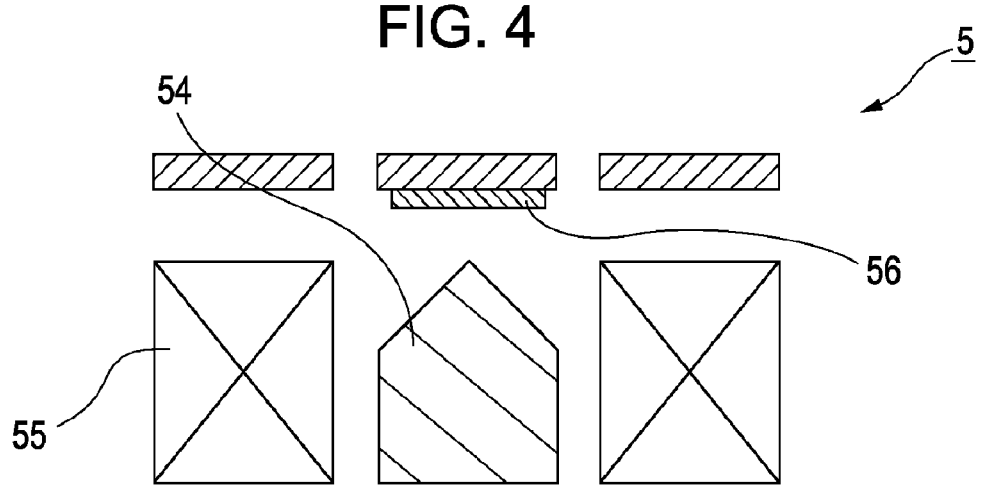
FIG. 4 is a sectional view of the resonant deflecting element shown in FIG. 3 taken along line IV-IV.

FIGS. 3 and 4 are diagrams illustrating the resonant deflecting element 5 according to a first embodiment of the present embodiment. FIG. 3 is a front view of the resonant deflecting element 5 and FIG. 4 is a sectional view of FIG. 3 taken along line IV-IV.

The resonant deflecting element 5 includes a device having a deflector 51 on which the deflecting surface 5a is provided, a driver element 52, and a torsion bar 53. These components are fixed to a frame that is formed integrally with a silicon substrate. A magnet 56 is attached to the driver element 52.

The resonant deflecting element 5 also includes an actuator having a core 54 and a coil 55 wound around the core 54. A magnetic field is generated due to electromagnetic induction by applying an alternating voltage to the coil 55.

When the frequency of the alternating voltage is set close to the natural frequency of the device in the torsional mode, the device resonates.

The device has a two-element structure including the driver element 52 and the deflector 51. This is because pseudo constant-speed motion of the deflector 51 can be obtained in a certain range by combining the sine vibration of the driver element 52 at the fundamental harmonic wave and the sine vibration of the deflector 51 at the secondary harmonic wave.

A laser adjustment operation in the optical scanning apparatus according to the first embodiment will be described below. In the laser adjustment, the semiconductor laser 1, which functions as a laser source, and the collimator lens 2, which functions as the light-beam converting unit, are adjusted. The laser adjustment operation includes a focus-state adjustment step and an irradiation position adjustment step. In the focus-state adjustment step, the distance between the semiconductor laser 1 and the collimator lens 2 is adjusted such that desired collimated light beam, convergent light beam, or divergent light beam is emitted. In the irradiation position adjustment step, coaxiality between the semiconductor laser 1 and the collimator lens 2, (e.g., positions thereof in a direction perpendicular to the optical axis), is adjusted such that the emitted light beam is incident on a desired target. These steps will be described in greater detail below.

The focus-state adjustment step will be described with reference to FIG. 1. First, adjustment tools used in the focus-state adjustment step will be described.

Referring to FIG. 1, sensors 91A and 91B are used as detecting units in the focus-state adjustment step. The sensors 91A and 91B are one-dimensional CCD sensors and are positioned at outermost positions on the surface to be scanned 8. The sensors 91A and 91B detect the light beam (outermost light beam portion) incident on the surface to be scanned 8 at the outermost positions in the main-scanning direction.

In the present embodiment, the light beam that is deflected by the deflecting surface 5a of the resonant deflecting element 5 and that passes through the imaging optical unit 6 is detected by the sensors 91A and 91B.

A calculating device 92 calculates the focus position of the light beam based on the information obtained by the sensors 91A and 91B.

A moving mechanism 93 functions as an adjusting unit, and adjusts the distance between the light-emitting point of the semiconductor laser 1 and the collimator lens 2 based on the information obtained by the sensors 91A and 91B.

The moving mechanism 93 holds the semiconductor laser 1 and moves the semiconductor laser 1 in the optical-axis direction based on the information from the sensors 91A and 91B.

The above-mentioned adjustment tools are mounted in the optical scanning apparatus and are used in the focus-state adjustment step.

The light beam from the semiconductor laser 1 passes through the imaging optical unit 6 and is incident on the surface to be scanned 8. The resonant deflecting element 5 reciprocates to cause the light beam to scan the surface to be scanned 8.

The light beam is incident on the sensors 91A and 91B when the light beam is at the outermost positions in the main-scanning direction (outermost light beam portion).

The sensors 91A and 91B used in the present embodiment have respective slits with a width of 10 µm at the front of the sensors 91A and 91B.

The sensors 91A and 91B output signals corresponding to spot profiles in the main-scanning direction when the light beam scans the sensors 91A and 91B.

The collimator lens 2 is fixed and the semiconductor laser 1 is moved by the moving mechanism 93 in the optical-axis direction while obtaining the spot profiles at each position of the semiconductor laser 1.

Then, the calculating device 92 calculates spot-diameter information in the main-scanning direction, (e.g., the diameter corresponding to a light intensity of at least $1/e^2$ times the peak light intensity for each profile).

Figure 5:
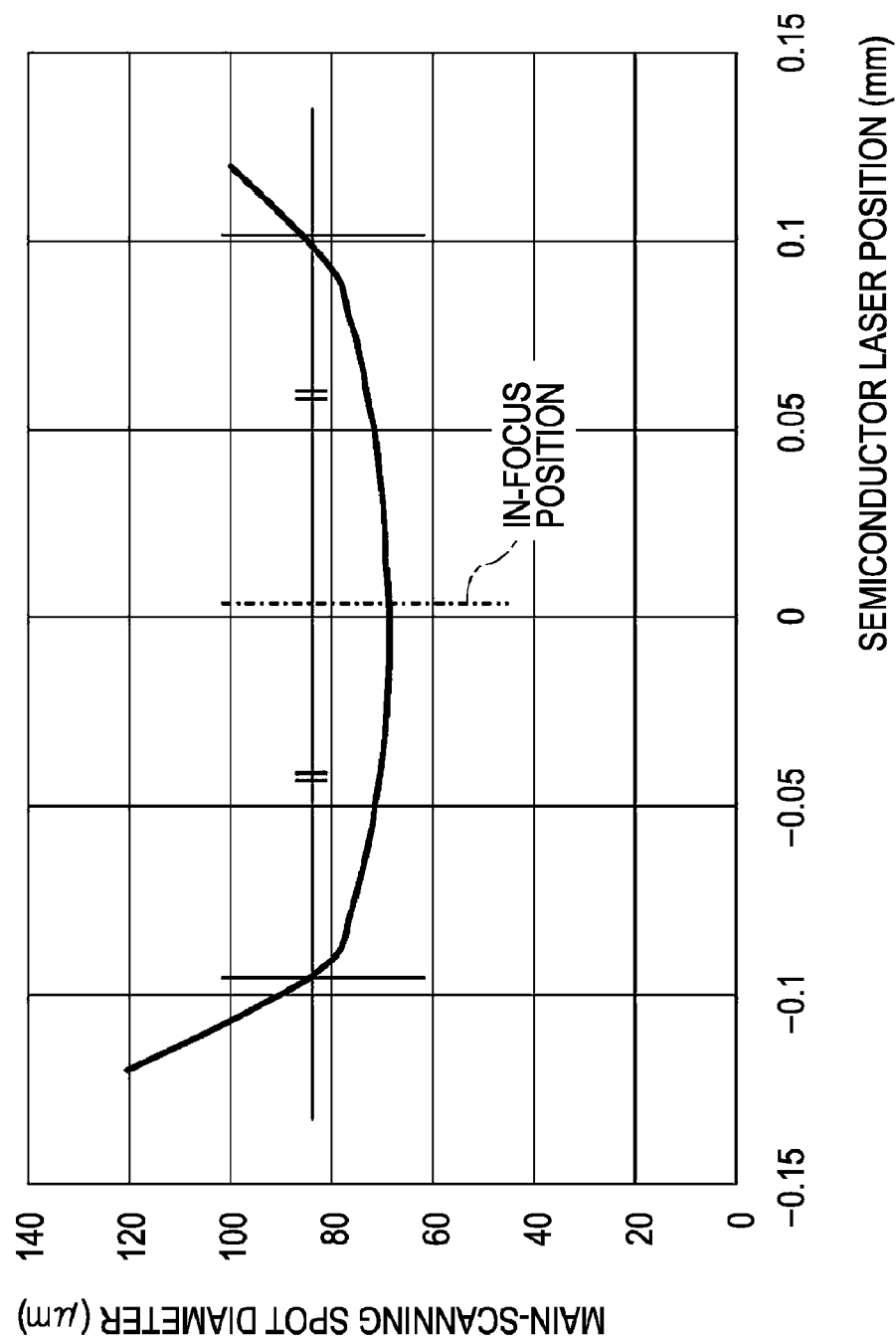
FIG. 5 is a graph showing the relationship between the semiconductor laser position and the main scanning spot diameter according to the first embodiment.

FIG. 5 is a graph showing the relationship between the position of the semiconductor laser 1 and the spot diameter in the main-scanning direction.

In the present embodiment, the slice level is set at 1.2 times the minimum spot diameter. The in-focus position is determined as the center of a region where the spot diameter is equal to or smaller than the slice level.

The average of the in-focus positions of the sensors 91A and 91B is determined and the semiconductor laser 1 is moved to a position corresponding to the average.

In the present embodiment, two sensors 91A and 91B are used so that the position of the semiconductor laser 1 can be adjusted to an optimum position taking into account the field curvature of the imaging optical unit 6. The adjustment accuracy can be increased by increasing the number of sensors.

The positions of the sensors can be determined in accordance with the field curvature of the imaging optical unit 6, and are not limited to the arrival positions of the outermost light beam portion.

Here, compensation for variation in the focus state in the case where the optical elements in the optical scanning apparatus have manufacturing errors and the deflecting surface 5a of the resonant deflecting element 5 is concave will be described.

Figure 6:
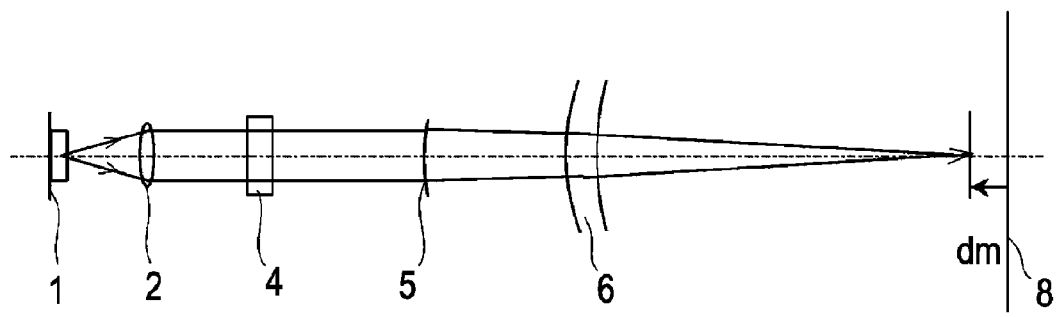
FIG. 6 is a diagram illustrating a change in focus state of a surface to be scanned caused by a concave shape of a deflecting surface in the case where the focus state is adjusted by applying a known method (that uses only the semiconductor laser and the collimator lens) to the structure of the present embodiment.

Referring to in FIG. 6, if a known focus-state adjustment method were applied, the semiconductor laser 1 and the collimator lens 2 would be individually subjected to a laser adjustment (not determined using the sensors 91A and 91B described above), and the light beam that leaves the deflecting surface 5a of the resonant deflecting element 5 would receive positive power but no compensation for its concavity. Therefore, the focus position would be moved away (by dm) from the surface to be scanned 8 toward the resonant deflecting element 5.

Figure 7:
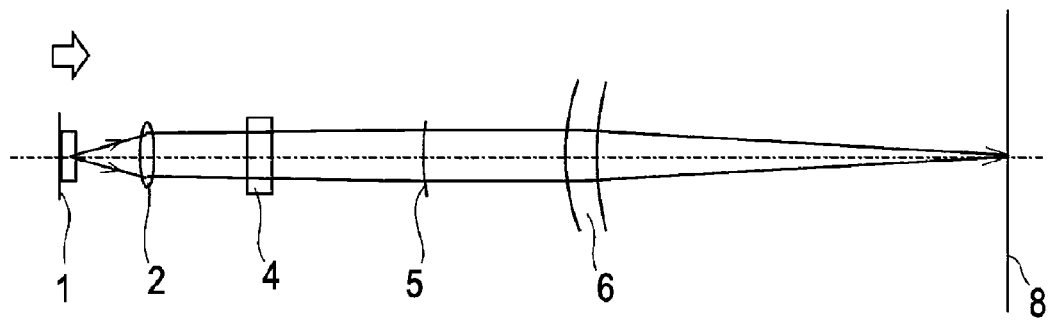
FIG. 7 is a diagram illustrating a change in focus state of a surface to be scanned caused by a concave shape of a deflecting surface in the case where the focus state is adjusted by a method according to the first embodiment.

In comparison, in the case where the light beam that leaves the deflecting surface of the resonant deflecting element 5 is detected and the laser adjustment of the present embodiment is performed based on the thus-obtained information, the distance between the semiconductor laser 1 and the collimator lens 2 is reduced such that the positive power of the deflecting surface 5a is compensated for, as shown in FIG. 7.

Therefore, as shown in FIG. 7, the focus position does not move off the surface to be scanned 8.

In FIG. 6, the amount of movement dm (mm) of the focus position from the surface to be scanned 8 can be expressed as follows:

$$dm = 2k^2/(Rm+2k)$$

where a scanning angular speed of the spot on the surface to be scanned 8 is k (mm/rad) and the radius of curvature obtained when the warped shape of the deflecting surface 5a of the resonant deflecting element 5 in the main-scanning direction is fitted to an arc by the least squares method is Rm (mm).

In the present embodiment, the movement of the focus position from the surface to be scanned 8 can be corrected. However, if the amount of correction exceeds 2E−2×k, the distance between the semiconductor laser 1 and the collimator lens 2 will greatly differ from the design value, and the focus position will be largely moved in the sub-scanning direction.

Here, the expression "E−X" means "×10$^{-X}$".

If the amount of correction is equal to or smaller than 1E−3×k, it is not necessary to perform the correction according to the present embodiment.

Therefore, the surface warping of the deflecting surface 5a of the resonant deflecting element 5 in the main-scanning direction can satisfy the following conditional expression (1):

$$1E-3 \times k < 2k^2/(Rm+2k) < 2E-2 \times k$$

This expression can be rewritten as follows:

$$1E-3 < 2k/(Rm+2k) < 2E-2 \qquad (1)$$

The above expression (1) can also be expressed as the following conditional expression (1'):

$$0.001 < 2k/(Rm+2k) < 0.02 \quad (1')$$

Although the case in which the deflecting surface 5a of the resonant deflecting element 5 is warped is explained above as an example, similar correction can also be performed, for example, in cases where other optical elements, such as the imaging lens (imaging optical system) 6a, have manufacturing errors.

In the focus-state adjustment step according to the present embodiment, the light beam emitted from the semiconductor laser 1 is caused to pass through all of the optical elements and is then incident on the sensors 91A and 91B.

As a result, the distance between the semiconductor laser 1 and the collimator lens 2 can be adjusted in consideration of variation in the focus state due to surface warping of the resonant deflecting element 5 and variation in the focus state caused by the imaging optical unit 6.

Next, the irradiation position adjustment step will be further described with reference to FIGS. 1 and 2. First, adjustment tools used in the irradiation position adjustment step will be described.

Referring to FIGS. 1 and 2, a half mirror 94 is placed on the optical path between the cylindrical lens 4 and the resonant deflecting element 5 in the irradiation position adjustment step. The half mirror 94 allows a portion of the light beam to pass therethrough toward the resonant deflecting element 5 and reflects another portion of the light beam toward an area sensor 95 that functions as a detecting unit.

The area sensor 95 is a two-dimensional CCD sensor and is used as the detecting unit in the irradiation position adjustment step. The area sensor 95 is disposed at a position that is optically equivalent to the position of the deflecting surface 5a of the resonant deflecting element 5. The area sensor 95 detects a light beam that does not reach the deflecting surface 5a of the resonant deflecting element 5.

The calculating device 92 calculates the irradiation position of the light beam based on the information obtained by the area sensor 95.

The moving mechanism 93 functions as an adjusting unit. The moving mechanism 93 adjusts the relative position between the light-emitting point of the semiconductor laser 1 and the collimator lens 2 in a direction perpendicular to the optical axis based on the information obtained by the area sensor 95.

The moving mechanism 93 holds the semiconductor laser 1 and moves the semiconductor laser 1 in a direction perpendicular to the optical axis of the collimator lens 2 based on the information obtained by the area sensor 95.

The above-mentioned adjustment tools are mounted in the optical scanning apparatus and are used in the irradiation position adjustment step.

A portion of the light beam that is emitted from the semiconductor laser 1 and that passes through the cylindrical lens 4 is reflected by the half mirror 94 downward in the optical scanning apparatus (FIG. 2). The half mirror 94 can also be replaced by a corner prism or a mirror.

The light beam reflected by the half mirror 94 is incident on the area sensor 95 in the form of a line image. The area sensor 95 is disposed at a position that is optically equivalent to the position of the deflecting surface 5a of the resonant deflecting element 5.

The information obtained by the area sensor 95 is input to the calculating device 92. The calculating device 92 calculates the irradiation position, that is, the center of gravity in the main-scanning direction and the sub-scanning direction.

The calculating device 92 determines the amount of movement of the semiconductor laser 1 at which the irradiation position can be set to a desired position. The semiconductor laser 1 is moved based on the result of the determination by the moving mechanism 93 in the direction perpendicular to the optical axis of the collimator lens 2. The semiconductor laser 1 is then fixed with an adhesive or the like.

The irradiation position can also be calculated based on the position corresponding to peak light quantity or the central value of half-value slice instead of the center of gravity.

In the irradiation position adjustment step according to the present embodiment, the area sensor 95 is disposed at a position equivalent to the position of the deflecting surface 5a of the resonant deflecting element 5, and the detecting unit 95 is adjusted such that roughly all of the light beam from the semiconductor laser 1 is incident on the area sensor 95.

In other words, the adjustment is performed such that roughly all of the light beam that passes through the collimator lens 2 is incident on the deflecting surface 5a of the resonant deflecting element 5.

Therefore, an installation error can be ignored which occurs in the case where the semiconductor laser 1 and the collimator lens 2 are individually subjected to the irradiation position adjustment and are then installed in the optical scanning apparatus. As a result, the size of the deflecting surface 5a of the resonant deflecting element 5 can be relatively reduced.

Figure 8:
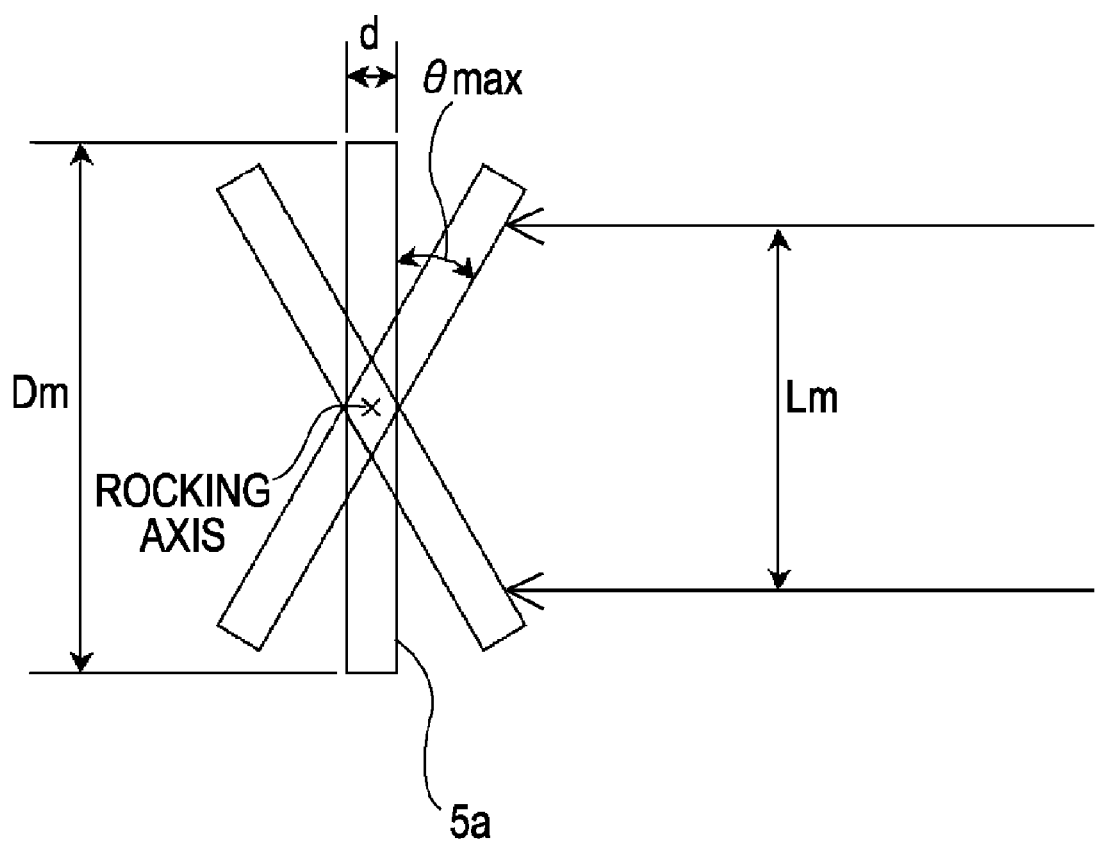
FIG. 8 is a main-scanning cross section of the structure around the deflecting surface of the resonant deflecting element according to the first embodiment.

FIG. 8 is a sectional view of the main part of the deflecting surface of the resonant deflecting element according to the present embodiment taken along the main-scanning direction (main-scanning cross section).

Referring to FIG. 8, a width Dmmin (mm) of the deflecting surface 5a in the main-scanning direction required to achieve deflecting and scanning of the incident light beam is expresses as follows:

$$Dm\text{min} = Lm/\cos\theta\text{max} + d\tan\theta\text{max}$$

where the thickness of the body forming the deflecting surface 5a is d (mm), the beam diameter of the light beam incident on the deflecting surface 5a in the main-scanning direction is Lm (mm), and the angle of the deflecting surface 5a at the time when the light beam is deflected toward an outermost position with respect to the deflecting angle of the deflecting surface 5a at the time when the light beam is deflected toward the scanning center is θmax (°).

As described above, according to the present embodiment, an installation error can be ignored which occurs in the case where the semiconductor laser 1 and the collimator lens 2 are individually subjected to the irradiation position adjustment and are then installed in the optical scanning apparatus.

To obtain a high-speed, large-field-angle deflecting device, the size of the deflecting surface 5a can be set as small as possible while taking into account the attachment tolerance of the resonant deflecting element 5. The width Dm of the deflecting surface 5a in the main-scanning direction can satisfy the following conditional expression (2):

$$1.0 \times Lm/\cos\theta\text{max} + d\tan\theta\text{max} < Dm < 1.2 \times Lm/\cos\theta\text{max} + d\tan\theta\text{max} \quad (2)$$

where the width of the deflecting surface 5a is D (mm), the thickness of the body forming the deflecting surface 5a is d (mm), the beam diameter of the light beam incident on the deflecting surface 5a in the main-scanning direction is Lm (mm), and the angle of the deflecting surface 5a at the time when the light beam is deflected toward an outermost position is θmax (°).

The conditional expression (2) regulates the width Dm of the deflecting surface 5a of the resonant deflecting element 5 in the main-scanning direction.

If the width Dm is below the lower limit of conditional expression (2), the incident light beam cannot be entirely deflected by the deflecting surface. If the width Dm is above the upper limit of conditional expression (2), the deflecting surface 5a is unnecessarily large and the performance such as speed, deflecting angle, jitter suppression, etc. of the optical deflecting device is degraded.

According to the present embodiment, the irradiation position is adjusted using the light beam that does not reach the resonant deflecting element 5. Therefore, unlike the case in which the adjustment is performed using the light beam that reaches the resonant deflecting element 5, no shift occurs in the irradiation position due to an arrangement error of the resonant deflecting element 5, in particular, a displacement between the resonance center and the imaging optical unit 6.

As described above, in the present embodiment, the light beam deflected by the deflecting surface of the resonant deflecting element is detected, and the distance between the light-emitting point and the collimator lens is adjusted based on the result of the detection. Thus, the focus-state adjustment can be performed in consideration of the surface accuracy (warping) of the deflecting surface.

As a result, variation in the focus state of the surface to be scanned due to warping of the deflecting surface can be reduced, and a resonant deflecting element having a deflecting surface with low surface accuracy can be used without degrading the optical characteristics.

In addition, the light beam that does not reach the deflecting surface of the resonant deflecting element is detected, and coaxiality between the light-emitting point and the collimator lens (positions thereof in a direction perpendicular to the optical axis) is adjusted based on the result of the detection. Thus, roughly all of the light beam emitted from the light-emitting point can be incident on the deflecting surface.

As a result, the size of the deflecting surface can be minimized.

Thus, according to the present embodiment, the optical scanning apparatus which can be reduced in size and which includes the resonant deflecting element capable of high-definition printing is provided. In addition, a method for adjusting the optical scanning apparatus is also provided.

In the present embodiment, the focus-state adjustment step and the irradiation position adjustment step are explained as individual steps. However, the adjustment tools used in the adjustment steps can be combined together and the adjustment steps can be performed as a continuous process.

In addition, in the present embodiment, the imaging lens 6a is formed integrally with the cylindrical lens 4. However, the imaging lens 6a and the cylindrical lens 4 can also be formed individually from each other. In addition, the imaging optical unit 6 is not limited to a single lens and can also be composed of a plurality of lenses.

Second Embodiment

Figure 9:
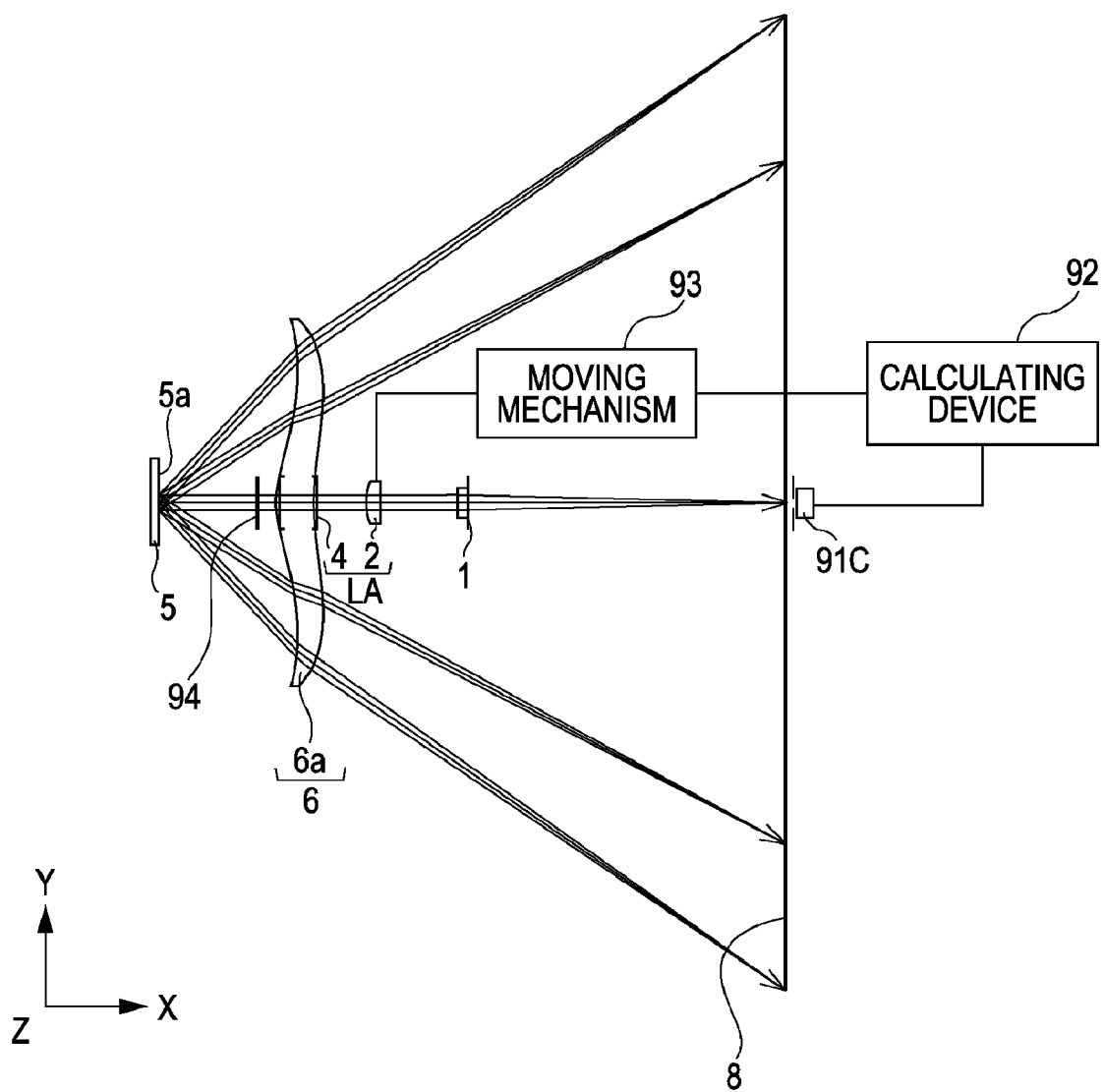
FIG. 9 is a main-scanning cross section of a structure according to a second embodiment of the present invention.

FIG. 9 illustrates a cross section of the main part of an optical scanning apparatus according to a second embodiment of the present invention taken along a main-scanning direction (main-scanning cross section). In FIG. 9, components that are the same as (or alternatively similar to) those shown in FIG. 1 are denoted by the same reference numerals.

The present embodiment differs from the first embodiment in that a detecting unit 91C used in the focus-state adjustment step is disposed at a position where an on-axis light beam is incident on the surface to be scanned 8. The detecting unit 91C detects the peak light quantity of the light beam. In addition, the semiconductor laser 1 is fixed and the collimator lens 2 is moved. Other structures and optical operations, including the irradiation position adjustment step, are the same as (or alternatively similar to) those in the first embodiment. Therefore, effects similar to those obtained by the first embodiment can also be obtained by the second embodiment.

The focus-state adjustment step according to the present embodiment will be described with reference to FIG. 9.

In FIG. 9, an area sensor 91C is used as the detecting unit in the irradiation position adjustment step. The area sensor 91C is a two-dimensional CCD sensor and is disposed on the surface to be scanned 8 at an on-axis position. The area sensor 91C detects the on-axis light beam that is deflected by the deflecting surface 5a of the resonant deflecting element 5 and that passes through the imaging optical unit 6.

In the focus-state adjustment according to the present embodiment, the area sensor 91C, the calculating device 92 that calculates the focus position based on the information obtained by the area sensor 91C, and the moving mechanism 93 that holds and moves the collimator lens 2 are used as adjustment tools mounted in the optical scanning apparatus.

The light beam emitted from the semiconductor laser 1 is incident on the deflecting surface 5a of the resonant deflecting element 5, is deflected toward the surface to be scanned 8, and is incident on the area sensor 91C.

In the present embodiment, different from the first embodiment, the focus-state adjustment is performed without causing the resonant deflecting element 5 to scan the laser beam while the deflecting surface 5a is stopped at the resonation center.

The area sensor 91C used in the present embodiment outputs the maximum brightness level of all of the pixels, which corresponds to the peak light quantity of the spot profile.

In addition, according to the present embodiment, different from the first embodiment, the semiconductor laser 1 is fixed and the collimator lens 2 is moved by the moving mechanism 93 in the optical-axis direction while obtaining the peak light quantity information at each position of the collimator lens 2.

Figure 10:
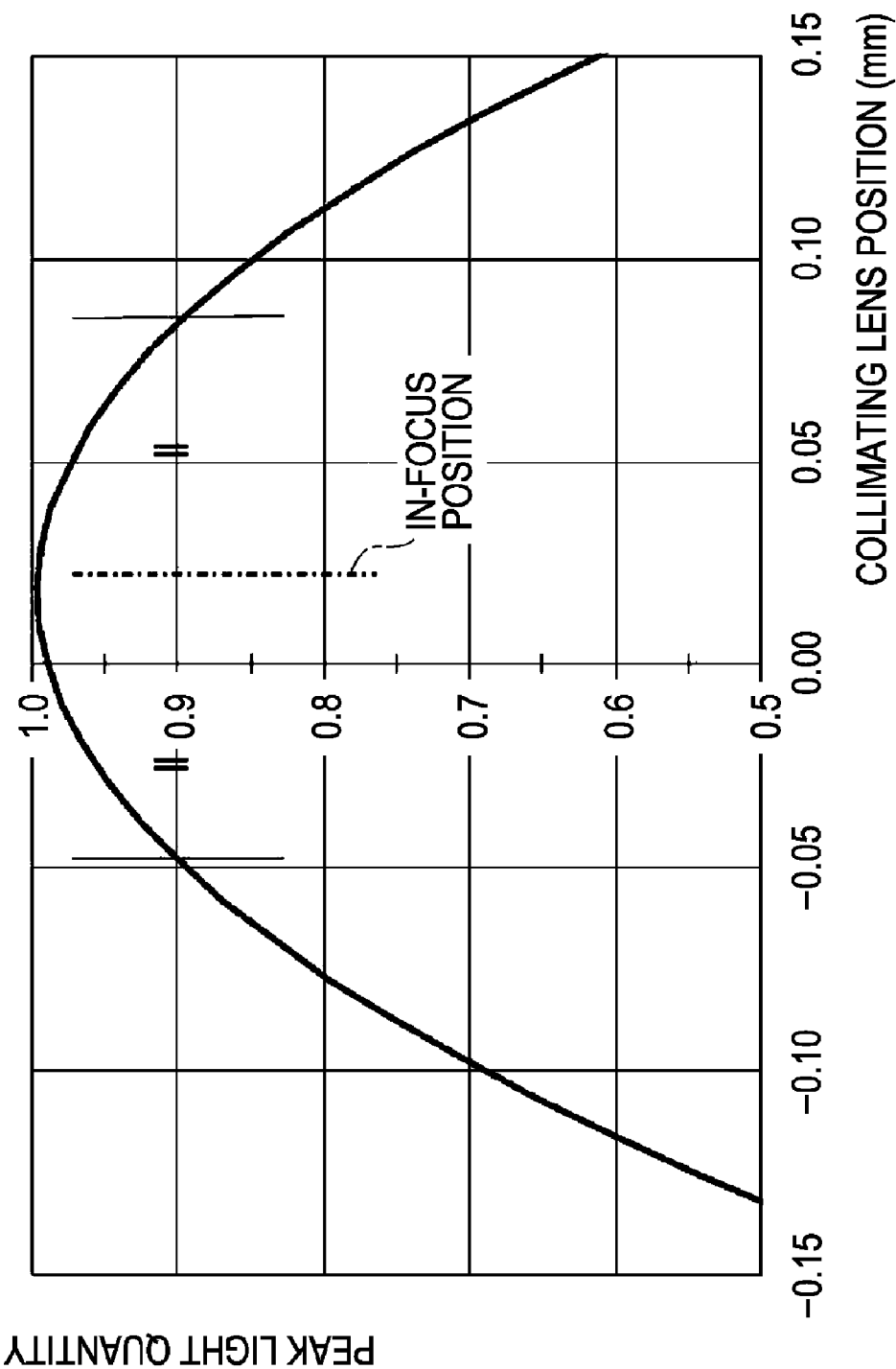
FIG. 10 is a graph illustrating the relationship between the collimator lens position and the peak light quantity according to the second embodiment.

FIG. 10 is a graph showing the relationship between the position of the collimator lens 2 and the peak light quantity.

In the graph shown in FIG. 10, the peak light quantity is normalized by the maximum value thereof, and the slice level is set at 0.9 times the maximum peak light quantity.

The in-focus position is determined as the center of a region where the peak light quantity is equal to or smaller than the slice level. The collimator lens 2 is moved to and fixed at the thus-determined position.

Like the first embodiment, in the present embodiment, the distance between the semiconductor laser 1 and the collimator lens 2 can be adjusted even when the deflecting surface 5a of the resonant deflecting element 5 has a manufacturing error, such as warping. Therefore, the focus position on the surface to be scanned 8 can be prevented from being displaced.

In addition, like the first embodiment, a scanning angular speed of the spot on the surface to be scanned 8, the radius of curvature obtained when the warped shape of the deflecting surface 5a of the resonant deflecting element 5 in the main-scanning direction is fitted to an arc shape by the least squares method, and an amount of movement of the focus position from the surface to be scanned 8 can satisfy the conditional expression (1).

Like the first embodiment, in the present embodiment, the light beam deflected by the deflecting surface of the resonant deflecting element is detected, and the distance between the light-emitting point and the collimator lens is adjusted based on the result of the detection. Thus, the focus-state adjustment can be performed in consideration of the surface accuracy (warping) of the deflecting surface.

In addition, the light beam that does not reach the deflecting surface of the resonant deflecting element is detected, and coaxiality between the light-emitting point and the collimator lens (positions thereof in a direction perpendicular to the optical axis) is adjusted based on the result of the detection. Thus, roughly all of the light beam emitted from the light-emitting point can be incident on the deflecting surface.

As a result, the size of the deflecting surface can be minimized.

The present embodiment is characterized in that the peak light quantity of the light beam that is stationary is detected in the focus-state adjustment step. Therefore, the adjustment can be performed in the products in which the light quantity on the surface to be scanned 8 is small. In addition, the calculation is simple and the adjustment tact can be reduced.

Thus, the optical scanning apparatus which can be reduced in size and which includes the resonant deflecting element capable of high-definition printing is provided. In addition, a method for adjusting the optical scanning apparatus is also provided.

In the first embodiment, the semiconductor laser 1 is moved in the focus-state adjustment step. In the second embodiment, the collimator lens 2 is moved in the focus-state adjustment step. However, the present invention is not limited to this, and the semiconductor laser 1 and the collimator lens 2 can be moved relative to each other such that the distance therebetween is changed.

In the first and second embodiments, in the irradiation position adjustment step, the semiconductor laser 1 is moved in a direction perpendicular to the optical axis. However, the present invention is not limited to this, and the collimator lens 2 can also be moved. Alternatively, the semiconductor laser 1 and the collimator lens 2 can be moved relative to each other.

Image Forming Apparatus

Figure 11:
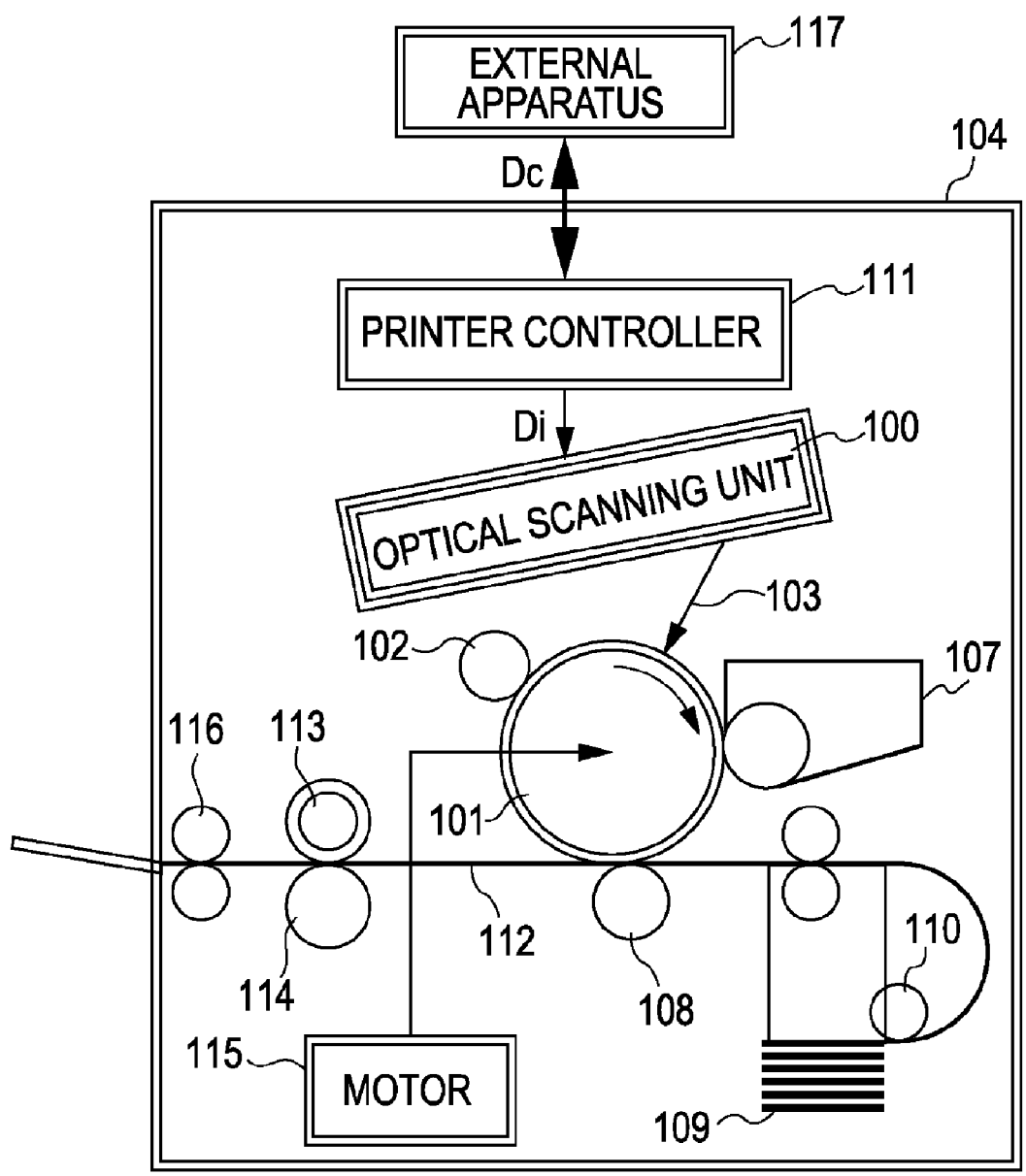
FIG. 11 is a sub-scanning cross section of an image-forming apparatus according to an embodiment of the present invention.

FIG. 11 is a cross-sectional view of the main portion of an image-forming apparatus according to an embodiment of the present invention taken along the sub-scanning direction. Referring to FIG. 11, an image-forming apparatus 104 receives code data Dc from an external apparatus 117, (e.g., a personal computer).

The code data Dc is converted into image data (dot data) Di by a printer controller 111 included in the image-forming apparatus 104.

The image data Di is input to an optical scanning unit 100, which can have a structure according to one of the above-described first and second embodiments.

The optical scanning unit 100 emits a light beam 103 modulated in accordance with the image data Di and a photosensitive surface of a photosensitive drum 101 is scanned in the main scanning direction by the light beam 103.

The photosensitive drum 101 can function as an electrostatic latent image carrier (photosensitive member) and is rotated clockwise by a motor 115.

Due to this rotation, the photosensitive surface of the photosensitive drum 101 moves relative to the light beam 103 in the sub-scanning direction, which is perpendicular to the main scanning direction.

A charging roller 102 for uniformly charging the surface of the photosensitive drum 101 is provided above the photosensitive drum 101 in such a manner that the charging roller 102 is in contact with the surface of the photosensitive drum 101.

The surface of the photosensitive drum 101 that is charged by the charging roller 102 is irradiated with the light beam 103 emitted from the optical scanning unit 100.

As described above, the light beam 103 is modulated based on the image data Di, and the surface of the photosensitive drum 101 is irradiated with this light beam 103 so that an electrostatic latent image is formed thereon.

The electrostatic latent image is developed as a toner image by a developing device 107 disposed such that the developing device 107 is in contact with the photosensitive drum 101 at a position downstream (relative to the rotating direction of the photosensitive drum 101) of the position at which the photosensitive drum 101 is irradiated with the light beam 103.

The toner image developed by the developing device 107 is transferred onto a paper sheet 112 that can function as a transferring material by a transferring roller 108 disposed below the photosensitive drum 101 so as to face the photosensitive drum 101.

Although the paper sheet 112 is fed from a paper cassette 109 disposed in front of the photosensitive drum 101 (on the right in FIG. 11) in this example, it can also be fed manually.

A paper feed roller 110 that is disposed at an end of the paper cassette 109 conveys the paper sheet 112 contained in the paper cassette 109 to a transporting path.

The paper sheet 112 on which the unfixed toner image is transferred as described above is further transported to a fixing device disposed behind the photosensitive drum 101 (on the left in FIG. 11).

The fixing device includes a fixing roller 113, which can have a fixing heater (not shown) therein, and a pressure roller 114 disposed so as to be in pressure contact with the fixing roller 113.

The paper sheet 112 conveyed from the transferring section is pressed and heated in a nip portion between the fixing roller 113 and the pressure roller 114 so that the unfixed toner image on the paper 112 is fixed.

Paper output rollers 116 are disposed behind the fixing roller 113 and the paper sheet 112 on which the image is fixed is output from the image-forming apparatus 104.

Although not shown in FIG. 11, the printer controller 111 not only performs the above-described data conversion but can also control components, such as the motor 115, included in the image-forming apparatus 104 and a polygon motor, which will be described below, included in the optical scanning unit 100.

The recording density of the image-forming apparatus according to the embodiment is not particularly limited. However, the required image quality is increased as the recording density is increased, and therefore the structures according to the first and second embodiments of the present invention are effective for use in an image-forming apparatus with a recording density of 1200 dpi or more.

Color Image-Forming Apparatus

Figure 12:
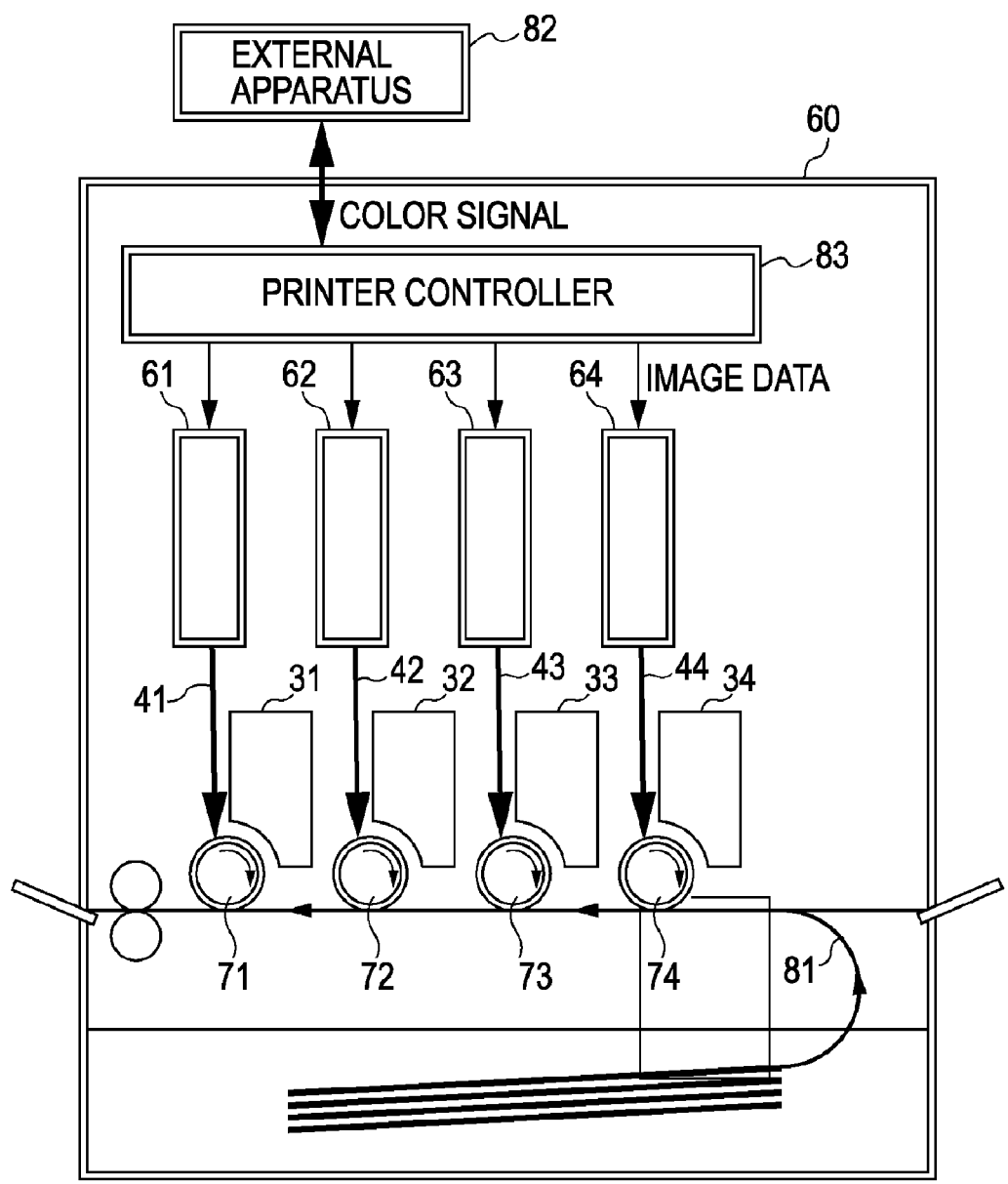
FIG. 12 is a diagram illustrating the main part of a color image-forming apparatus according to an embodiment of the present invention.
Figure 13:
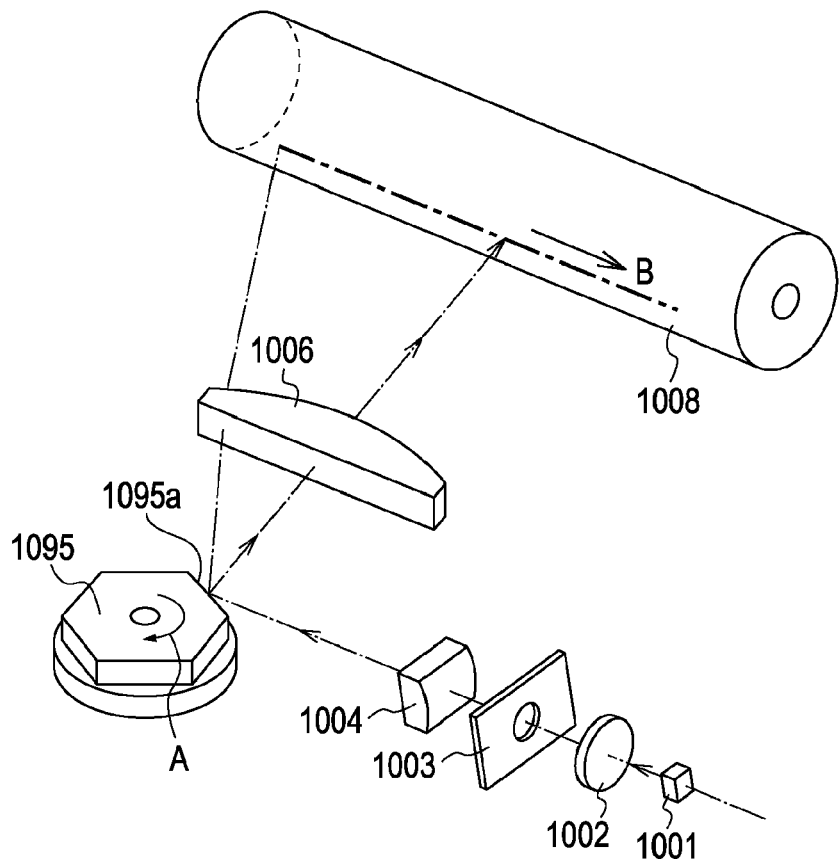
FIG. 13 is a perspective view of the main part of a known optical scanning apparatus.
Figure 14:
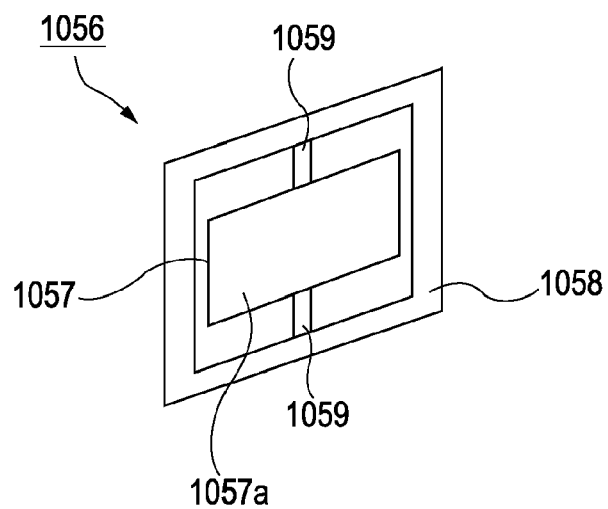
FIG. 14 is a diagram illustrating the main part of a known resonant deflecting element.

FIG. 12 is a schematic diagram illustrating the main portion of a color image-forming apparatus according to another embodiment of the present invention.

In the present embodiment, the color image-forming apparatus is of a tandem type in which four optical scanning apparatus can be arranged and image information can be recorded in parallel on surfaces of photosensitive drums that function as image carriers.

Referring to FIG. 12, a color image-forming apparatus 60 includes optical scanning apparatuses 61, 62, 63 and 64, which each have the structure according to one of the above-described embodiments, photosensitive drums 71, 72, 73 and 74 which each can function as an image carrier, developing devices 31, 32, 33 and 34, and a conveying belt 81.

In FIG. 12, the toner image developed by the developing devices is transferred onto a transferring material by a transferring device (not shown) and the thus-transferred toner image is fixed by a fixing device (not shown).

Referring to FIG. 12, the color image-forming apparatus 60 receives red (R), green (G), and blue (B) signals from an external apparatus 82, such as a personal computer. These signals are respectively converted into cyan (C), magenta (M), yellow (Y), and black (B) image data elements by a printer controller 83 included in the color image-forming apparatus 60.

The image data elements are input to the corresponding optical scanning apparatuses 61, 62, 63 and 64, respectively.

The optical scanning apparatuses 61, 62, 63 and 64 emit light beams 41, 42, 43, and 44 modulated in accordance with the respective image data elements, and photosensitive surfaces of the photosensitive drums 71, 72, 73 and 74 are scanned in the main scanning direction by the light beams 41, 42, 43, and 44, respectively.

In this color image-forming apparatus 60, four optical scanning apparatuses 61, 62, 63 and 64 corresponding to cyan (C), magenta (M), yellow (Y), and black (B), respectively, can be arranged and image signals (image information) are recorded in parallel on the surfaces of the photosensitive drums 21, 22, 23 and, 24, respectively. Accordingly, color images can be printed at a high speed.

In the color image-forming apparatus 60 according to the present exemplary embodiment, the four optical scanning apparatus 11, 12, 13, and 14 form four latent images of the respective colors on the surfaces of the photosensitive drums 71, 72, 73 and 74 using light beams based on the respective image data elements.

Then, the images are transferred onto the paper sheet so that a single full-color image is formed thereon.

The external apparatus 82 can include, for example, a color image reading apparatus, which can have a CCD sensor.

In this case, a system including the color image reading apparatus and the color image-forming apparatus 60 can function as a color digital copying machine.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-218305 filed Aug. 24, 2007, which is hereby incorporated by reference herein in its entirety.

What is claimed is:

1. A method for adjusting an optical scanning apparatus including a light source having a light-emitting point; a light-beam converting unit configured to convert a state of a light beam emitted from the light-emitting point of the light source into another state; a deflecting unit configured to deflect and scan the light beam emitted from the light-beam converting unit, the deflecting unit including a resonant deflecting element having a single deflecting surface that reciprocates around an axis; and an imaging optical unit configured to cause the light beam deflected and scanned by the deflecting surface of the deflecting unit to form an image on a surface to be scanned, the method comprising:

detecting the light beam emitted from the light source, deflected by the deflecting surface of the deflecting unit, and transmitted through the imaging optical unit with a first detector; and adjusting a distance between the light-emitting point of the light source and the light-beam converting unit with an adjusting unit based on information obtained by the first detector;

wherein the following condition is satisfied:

$$0.001 < 2k/(Rm+2k) < 0.02$$

where k is a scanning angular speed of a spot on the surface to be scanned and Rm is a radius of curvature obtained when a warped shape of the deflecting surface of the resonant deflecting element in a main-scanning direction is fitted to an arc shape by the least squares method.

2. The method according to claim 1, wherein the light beam detected by the first detector is incident on the first detector at an outermost position along an axis in a main scanning direction.

3. The method according to claim 1, wherein information regarding a spot diameter of the light beam on the surface to scanned is obtained from the light beam detected by the first detector.

4. The method according to claim 1, wherein information regarding peak power of the light beam on the surface to scanned is obtained from the light beam detected by the first detector.

5. The method according to claim 1, further comprising:

detecting a light beam that does not reach the deflecting surface of the deflecting unit with a second detector different from the first detector; and adjusting a positional relationship between the light-emitting point of the light source and the light-beam converting unit in a direction perpendicular to an optical axis with the adjusting unit based on information obtained by the second detector.

6. A method for adjusting an optical scanning apparatus including a light source having a light-emitting point; a light-beam converting unit configured to convert a state of a light beam emitted from the light-emitting point of the light source into another state; a deflecting unit configured to deflect and scan the light beam emitted from the light-beam converting unit, the deflecting unit including a resonant deflecting element having a single deflecting surface that reciprocates around an axis; and an imaging optical unit configured to cause the light beam deflected and scanned by the deflecting surface of the deflecting unit to form an image on a surface to be scanned, the method comprising:

detecting the light beam that is emitted from the light source and that does not reach the deflecting surface of the deflecting unit with a first detector; and adjusting a positional relationship between the light-emitting point of the light source and the light-beam converting unit in a direction perpendicular to an optical axis with an adjusting unit based on information obtained by the first detector;

wherein the following condition is satisfied:

$$1.0 \times Lm/\cos\theta max + d\tan\theta max < Dm < 1.2 \times Lm/\cos\theta max + d\tan\theta max$$

where Dm is the width of the deflecting surface of the resonant deflecting element in a main-scanning direction, d is the thickness of a body forming the deflecting surface, Lm is the beam diameter of the light beam incident on the deflecting surface in the main-scanning direction, and θmax is the angle of the deflecting surface at the time when the light beam is deflected toward an outermost position with respect to an angle of the deflecting surface at the time when the light beam is deflected toward a scanning center.

7. The method according to claim 6, wherein the adjusting unit adjusts the positional relationship between the light-emitting point of the light source and the light-beam converting unit in the direction perpendicular to the optical axis such that roughly all of the light beam emitted from the light source and transmitted through the light-beam converting unit is incident on the deflecting surface of the deflecting unit.

8. The method according to claim 6, wherein the first detector is disposed at a position that is optically equivalent to a position of the deflecting surface of the deflecting unit.

9. The method according to claim 6, further comprising:
detecting the light beam that is deflected by the deflecting surface of the deflecting unit with a second detector different from the first detector; and
adjusting a distance between the light-emitting point of the light source and the light-beam converting unit along the optical axis with the adjusting unit based on information obtained by the second detector.

* * * * *